Sept. 21, 1948.  W. M. LAWHORNE  2,449,660
CABLE CONNECTOR
Filed July 26, 1945

Attest
Robert D. Staples
Andrew T. Zodl

INVENTOR.
William M. Lawhorne
BY
Norbert E. Birch
Attorney

Patented Sept. 21, 1948

2,449,660

UNITED STATES PATENT OFFICE 2,449,660

CABLE CONNECTOR

William M. Lawhorne, Primos, Pa., assignor to The Atlantic Refining Company, Philadelphia, Pa., a corporation of Pennsylvania Application July 26, 1945, Serial No. 607,156

2 Claims. (Cl. 173—328)

The present invention relates to improvements in couplings and, more specifically, to that type of coupling used for detachably connecting electric cables and the like.

In those situations where it may be necessary to join several lengths of cable to provide a line through which a current of electricity can be passed, it is desirable to have a coupling by the use of which one may easily connect or detach such lengths of cable and which will not impede the flow of current therethrough. The devices which have heretofore been known in the art, have been subject to several disadvanages. Couplings of relatively simple construction have been subject to accidental disconnection. Furthermore, the more intricate that the couplings were made to overcome that fault, the greater became the difficulty in connecting and detaching the device. There also arose the problem of insulating the coupling to prevent arcing or short circuiting by reason of accidental grounding.

Therefore, it is an object of the present invention to furnish a universal coupling by the use of which any two lengths of cable provided therewith can be joined, regardless of which ends of the cables may be brought together.

A further object of the present invention is to provide a universal coupling of sturdy, simple construction by which any two lengths of cable provided therewith can be readily connected or detached, and which are not susceptible to accidental disconnection.

Another object of the present invention is to provide a universal coupling for electric cables, such coupling having a sufficiently large contact area between the elements thereof so as not to impede the flow of electric current therethrough.

Another object of the present invention is to provide a universal coupling with insulating means slidably mounted and frictionally held thereon to prevent arcing or short circuiting, such insulating means further serving as an additional safeguard against accidental disconnection of the coupling.

Other objects of the invention will readily be apparent from the description and claims which follow.

Referring now to the drawing in which like numerals are used to designate like parts:

Figure 1:
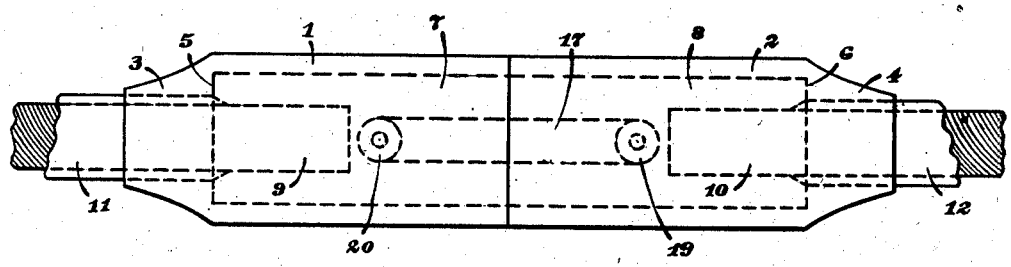
Figure 1 is a top plan view of the invention showing the terminal members of the coupling in operative engagement.

In the drawings, 1 and 2 are identically formed insulating sleeves, slidably mounted and frictionally held upon the metallic terminal members of the device. Such sleeves may be fabricated from any desired insulating materials, but preferably from a resilient insulating material such as rubber or the like, for reasons which will be given hereinafter. Sleeves 1 and 2 are formed with tapered ends 3 and 4 respectively and internal shoulders 5 and 6 respectively, the purpose of which will be described hereinafter. The tapered ends 3 and 4 should be so formed that the sleeves can easily slide over the insulated cable and yet give a snug protective fit when the device is in use.

Covered by the sleeves 1 and 2 are identically shaped metallic terminal members 7 and 8, preferably, although not necessarily, cylindrical in shape. Such terminal members may be formed from any desired metal possessing the requisite properties of hardness, strength, and electrical conductivity. Recesses 9 and 10 are formed axially in terminal members 7 and 8, respectively, to permit the insertion therein of the uninsulated ends of electric cables 11 and 12, respectively.

Terminal member 7 has formed therein longitudinal channels 13 and 14 diametrically opposite on its circumference. Similar channels 15 and 16 are provided in terminal member 8. Channels 13 and 16 are adapted to receive arms 17 and 18, respectively, such arms being rigidly affixed therein by brazing, or silver soldering, or in any other suitable manner. Adjacent the outer end of arms 17 and 18 are lugs 19 and 20, respectively, preferably rigidly affixed by brazing or silver soldering.

Channels 14 and 15 are each provided with an additional transverse bore 21 and 22, respectively, formed adjacent the inner ends thereof, said bores being adapted to receive lugs 19 and 29 respectively on arms 17 and 18, respectively.

Figure 3:
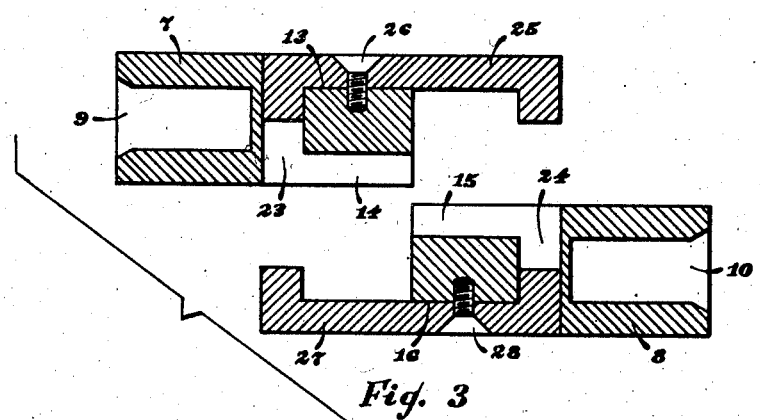
Figure 3 is a side sectional view showing an alternate form of the terminal members of the coupling.

Figure 3 represents an alternate form of the invention. The ends of channels 13 and 14 are connected by bore 23 extending transversely through terminal member 7. A similar bore 24 extending transversely through terminal member 8 connects the ends of channels 15 and 16.

Channel 13 and bore 23 in terminal member 7 are adapted to receive one half of U-shaped arm 25 which is affixed to terminal member 7 by a bolt 26, or by other suitable means. A similar U-shaped arm 27 is adapted to be received by bore 24 and channel 16 in terminal member 8, and to be fastened to such terminal member by a bolt 28, or by other suitable means.

It will be understood that, while the devices described above represent the preferred forms of the invention, certain minor variations can be made. For example, U-shaped arms 25 and 27 need not be fastened to terminal members 7 and 8 but may be used as entirely separate pieces. Furthermore, such arm as shown in either Figure 2 or Figure 3 can be fabricated as integral parts of the terminal member.

Figure 2:
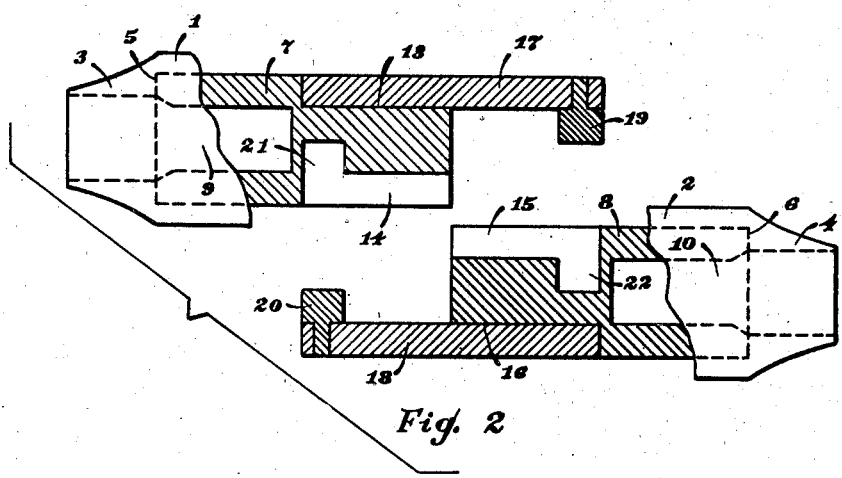
Figure 2 is a side sectional view showing the terminal members of the coupling disengaged and a portion of the insulating means cut away for the purposes of clarity.

The operation of the device shown in Figure 2 is as follows:

Insulating sleeves 1 and 2 are slipped over the ends of cables 11 and 12, respectively. The insulation is removed from the ends of such cables, the uninsulated end of cable 11 being inserted into recess 9 in terminal member 7 and the uninsulated end of cable 12 into recess 10 in terminal member 8. The cable ends are then firmly secured within such recesses by any suitable means, such as by sweating, soldering, brazing, or the like.

Terminal members 7 and 8 are brought together, and lug 19 on the free or unengaged end of arm 17 is inserted into bore 22 in terminal member 8. Simultaneously therewith lug 20 on the free end of arm 18 is received by bore 21 in terminal member 7.

Insulating sleeve 1 is slipped over terminal member 7 until the end of such terminal member engages internal shoulder 5 of insulating sleeve 1. Insulating sleeve 2 is slipped over terminal member 8 until the end of such terminal member engages internal shoulder 6 on insulating sleeve 2. The position of such internal shoulders is so spaced that, when contact is made between them and the terminal members, such terminal members will be completely covered by insulating sleeves 1 and 2. The advantage of the use of resilient insulating material for insulating sleeves 1 and 2 here becomes apparent. The resilient material is preferably due to its tendency temporarily to bind or adhere to the metallic surfaces of the terminal members and thus is able to withstand forces likely to cause accidental longitudinal displacement. Non-resilient materials lacking this adherent quality are easily displaced unless fitted with some means such as coacting thread or the like to maintain them in proper position.

It will further be noted that insulating sleeves 1 and 2 serve also as a cover to prevent deterioration of the metallic terminal members through corrosion, and as a means for preventing the accidental disconnection of such terminal members by twisting when the cable is pulled over the ground.

The operation of the alternate form of the invention shown in Figure 3 is as follows:

Terminal members 7 and 8 are brought together, and the free or unengaged end of U-shaped arm 25 is inserted into bore 24 and channel 15 in terminal member 8. Simultaneously therewith the free end of U-shaped arm 27 is received by bore 23 and channel 14 in terminal member 7.

The remainder of the operation of this modification of the device is identical with that disclosed above in connection with the modification shown in Figure 2.

The examples here given and the particular description set forth are presented in order to illustrate how the invention may be applied. Other forms and variations coming within the scope of the appended claims will readily suggest themselves to those skilled in the art.

I claim:

1. In a device for connecting electric cables, a cylindrical terminal member, a recess extending axially inwardly of one end of said terminal member and adapted to receive the end of an electric cable, two longitudinal channels formed in the periphery of said terminal member diametrically opposite to one another and extending inwardly from the other end of said terminal member, a recess extending transversely of said terminal member and communicating with the inner end of said longitudinal channels, an arm affixed in one of said longitudinal channels and extending beyond the end of said terminal member, a lug on the free end of said arm, said lug projecting radially inwardly of said terminal member, and a resilient insulating sleeve slidably fitted and frictionally held on said terminal member.

2. A device for connecting electric cables, comprising two complementary shaped terminal members, means for securing an electric cable to the end of each of the terminal members, each of such terminal members at its opposite end being provided with a longitudinal inwardly extending groove terminating in a recess in one face thereof and at its diametrically opposite face with a longitudinal outwardly extending arm terminating in a radially inwardly extending lug, said arm and lug respectively being complementary to said groove and recess, and a resilient insulating sleeve slidably fitted and frictionally held on each of said terminal members, the sleeve of each terminal member being adapted to secure the arm and lug of the other of said terminal members relative to the groove and recess of its terminal member.

WILLIAM M. LAWHORNE.

REFERENCES CITED

The following references are of record in the file of this patent:

UNITED STATES PATENTS

| Number | Name | Date |
|---|---|---|
| 309,324 | Vanduzen | Dec. 16, 1884 |
| 613,663 | Case | Nov. 8, 1898 |
| 693,595 | Frazier | Feb. 18, 1902 |
| 743,346 | Swain | Nov. 3, 1903 |
| 1,236,404 | Clerget | Aug. 14, 1917 |
| 1,975,244 | Wiseman | Oct. 2, 1934 |
| 2,138,576 | Gebert | Nov. 29, 1938 |
| 2,171,726 | Howell | Sept. 5, 1939 |